US007462338B2

(12) United States Patent
Southward

(10) Patent No.: US 7,462,338 B2
(45) Date of Patent: Dec. 9, 2008

(54) BORON-ALUMINA CATALYST SUPPORT

(75) Inventor: Barry W. Southward, Catoosa, OK (US)

(73) Assignee: Umicore AG & Co. Kg, Hanau (DE)

( * ) Notice: Subject to any disclaimer, the term of this patent is extended or adjusted under 35 U.S.C. 154(b) by 430 days.

(21) Appl. No.: 11/024,068

(22) Filed: Dec. 28, 2004

(65) Prior Publication Data
US 2006/0140831 A1 Jun. 29, 2006

(51) Int. Cl.
B01D 53/94 (2006.01)
B01J 29/06 (2006.01)
B01J 21/00 (2006.01)
B01J 23/00 (2006.01)
B01J 20/00 (2006.01)

(52) U.S. Cl. ............... 423/213.5; 502/63; 502/64; 502/73; 502/74; 502/87; 502/202; 502/207; 502/327; 502/355; 502/415; 502/439

(58) Field of Classification Search .......... 502/63, 502/73, 74, 207, 327, 355, 415, 439, 87, 502/202, 64; 423/213.5
See application file for complete search history.

(56) References Cited

U.S. PATENT DOCUMENTS

| 3,770,616 | A | * | 11/1973 | Kominami et al. | 208/138 |
| 3,954,670 | A | * | 5/1976 | Pine | 502/65 |
| 4,613,720 | A | * | 9/1986 | Bonifaz et al. | 585/640 |
| 4,661,467 | A | * | 4/1987 | Kuehl | 502/202 |
| 4,665,043 | A | * | 5/1987 | Chu et al. | 502/71 |
| 4,788,169 | A | * | 11/1988 | Degman et al. | 502/61 |
| 5,187,132 | A | * | 2/1993 | Zones et al. | 502/64 |
| 5,397,756 | A | * | 3/1995 | Dufresne et al. | 502/33 |
| 5,516,740 | A | * | 5/1996 | Cody et al. | 502/204 |
| 6,096,933 | A | * | 8/2000 | Cheung et al. | 585/260 |
| 6,288,007 | B1 | * | 9/2001 | Lindblad et al. | 502/261 |
| 6,399,530 | B1 | * | 6/2002 | Chen et al. | 502/64 |
| 6,413,898 | B1 | * | 7/2002 | Faber et al. | 502/64 |
| 6,420,296 | B2 | * | 7/2002 | Mignard et al. | 502/79 |
| 6,613,709 | B1 | * | 9/2003 | Merlen et al. | 502/64 |
| 2002/0016253 | A1 | * | 2/2002 | Mignard et al. | 502/79 |
| 2006/0280677 | A1 | * | 12/2006 | Hagemeyer et al. | 423/648.1 |

FOREIGN PATENT DOCUMENTS

| EP | 0645172 | 3/1995 |
| EP | 1468720 | 10/2004 |
| JP | 11165073 | 6/1999 |
| JP | 2001079416 | 3/2001 |
| JP | 2005279382 | 10/2005 |
| WO | 2005102513 | 11/2005 |

OTHER PUBLICATIONS

European Search Report for 05077772.1.
R. Burch et al., "The Effect of SO2 on the Activity of PD-based Catalysis in Methane Combustion", Catalyst Letters, vol. 72, No. 3-4, (2001), Jan. 11, 2001, pp. 153-155.
Characterization of ?-alumina and borated alumina catalysts; Cristina Flego and Wallace O'Neil Parker; Applied Catalysis A: General 1999, 185:1:137-152; Abstract Only, 1 page.
Acid-base properties of alumina-supported M2O3 (M=B, Ga, In) catalysts; Petre AL, Perdigon-Melon JA, Gervasini A, Auroux A; Topics in Catalysis 19 (3-4): 271-281 2002; Abstract Only, 1 page.
Pulsed EPR study of orthophosphoric and boric acid modified gamma-alumina; Samoilova RI, Dikanov SA, Fionov AV, Tyryshkin AM, Lunina EV, Bowman MK; Journal of Physical Chemistry, 100 (44): 17621-17629 Oct. 31, 1996; Abstract Only, 1 page.
Effect of Preparation Method of the Acidities of AL-B-OX Mixed Oxides; Li CP, Chen YW; Catalysis Letters 19 (1): 99-108 1993; Abstract Only, 1 page.
The Thioresistance of Platinum Aluminium Borate Catalysts in Aromatic Hydrogenation; Huang TC, Kang BC; Journal of Molecular Catalysis A-Chemical 103 (3): 163-174 Nov. 10, 1995; Abstract Only, 1 page.
Effect of Boron Addition on the Activity and Selectivity of Hydrotreating COMO/AL2O3 Catalysts; Ramirez J, Castillo P, Cedeno L, Cuevas R, Castillo M, Palacios JM, Lopezagudo A; Applied Catalysis A-General 132 (2): 317-334 Nov. 23, 1995; Abstract Only, 1 page.
Hydrodesulfurization Reactions of Atmospheric Gas Oil Over Como Alumina-Aluminum Borate Catalysts; Li CP, Chen YW, Yang SJ, Wu JC; Industrial & Engineering Chemistry Research 32 (8): 1573-1578 Aug. 1993, /Abstract Only, 1 page.
Effect of boron on the sulfur poisoning of Co/TiO2 Fischer-Tropsch catalysts, Li JL, Coville NJ, Applied Catalysis A-General 208 (1-2): 177-184 Feb. 14, 2001, Abstract Only, 1 page.
The effect of SO2 on the activity of Pd-based catalysts in methane cumbustion, Burch, R., Crittle D.J., Southward B.W.L., and Sullivan J.A., Catalysis Letters 72 (3/4) p. 153-155, Abstract Only, 1 page.

* cited by examiner

Primary Examiner—Cam N. Nguyen
(74) Attorney, Agent, or Firm—Smith, Gambrell & Russell, LLP

(57) ABSTRACT

In one embodiment, an oxidation catalyst comprises a catalytic material disposed on a support. The support comprises boron modified alumina and about 10 wt % to about 50 wt % zeolite, based upon the total weight of the support. The boron is present in a sufficient amount up to less than or equal to about 7 wt %, based upon a total weight of the alumina, to selectively poison a portion of the alumina.

13 Claims, No Drawings

BORON-ALUMINA CATALYST SUPPORT

BACKGROUND

Exhaust emissions from motor vehicles are a significant source of air pollution. The most significant vehicular emissions comprise pollutants such as carbon monoxide (CO), oxides of nitrogen (NO, $N_2O$, $NO_2$), unburnt hydrocarbons (HC), oxides of sulfur ($SO_2$), and particulates. For conventional gasoline engines dramatic decreases in tailpipe emissions have been realized by the introduction and refinement of the three-way catalytic converter. Unfortunately, the lean-burn operation of diesel or gasoline direct-injection engines is incompatible with this established technology.

Various techniques have been explored to control diesel emissions, e.g., engine modification and/or the use of exhaust after treatment such as catalytic control systems which eliminate pollutants in the exhaust stream by promoting chemical changes to convert unwanted compounds into more benign species. However, for effective emission control a diesel oxidation catalyst must be active at the comparatively low temperatures (e.g., typically below 550° C.) of the diesel exhaust, i.e., must posses a low temperature "light off" (i.e., a low temperature (e.g., less than 200° C. after aging) at which the catalyst becomes 50% efficient for a particular emission component).

A further area of concern arise from catalyst poisoning, e.g., by sulfur compounds and sintering of the platinum group metal (PGM). Poisoning by sulfur compounds can markedly decrease catalyst activity by affecting the platinum group metal oxidation function by preferential adsorption/site blocking. In addition sulfur compound may also compromise support integrity, e.g., by the chemical modification of the support (such as conversion of $Al_2O_3$ into $Al_2(SO_4)_3$) and poison any oxygen storage function present in the catalyst formulation with further loss in activity.

There continues to be a need for methods and catalysts for use in emissions reductions.

SUMMARY

Disclosed herein are catalysts, catalyst supports, and methods for using the same. In one embodiment, an oxidation catalyst can comprise a catalytic material disposed at a support. The support can comprise boron modified alumina and about 10 wt % to about 50 wt % zeolite, based upon the total weight of the support. The boron can be present in a sufficient amount to selectively poison a portion of the alumina to less than or equal to about 7 wt % boron, based upon a total weight of the alumina.

In one embodiment, a catalytic device can comprise a housing disposed around a substrate with a compression ignition oxidation catalyst disposed at the substrate. Also, the method for treating a compression ignition exhaust stream can comprise: introducing a diesel exhaust stream to a compression ignition oxidation catalyst; and oxidizing an exhaust stream component.

The above-described and other features will be appreciated and understood by those skilled in the art from the following detailed description and appended claims.

DETAILED DESCRIPTION

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). The modifier "about" used in connection with a quantity is inclusive of the stated value and has the meaning dictated by the context (e.g., includes the degree of error associated with measurement of the particular quantity). The notation "±10%" means that the indicated measurement may be from an amount that is minus 10% to an amount that is plus 10% of the stated value.

Disclosed herein is a modified alumina that can be a support for an active (catalytic) material that is particularly useful in compression ignition engine exhaust conditions. The modified alumina comprises a sufficient amount of boron to selectively poison some of the basic portions of the alumina (e.g., to inhibit the alumina from reacting with $SO_2$ and/or to decrease a rate of active material sintering). Desirably, the amount of boron material present in the alumina can be less than an amount that would form mixed phases of aluminum-boron-oxide (e.g., a sign of fluxing). Generally, the modified alumina (and/or silica-alumina) can comprise a sufficient amount of boron to selectively poison some of the alumina to less than or equal to about 7 wt % boron, or, more specifically, about 0.1 wt % to about 5 wt % boron, or, even more specifically, about 0.5 wt % to about 2.5 wt % boron, and, even more specifically, about 1 wt % to about 2 wt % boron based upon a total dry weight of the alumina and, if present, silica (and not the boron).

The alumina can comprise any alumina typically employed in the particular conditions under which the catalyst will be employed. Desirably, the alumina comprises high surface area alumina (e.g., greater than 50 square meters per gram) including delta phase alumina, theta phase alumina, gamma phase alumina, and combinations comprising at least one of the foregoing aluminas. The alumina can also be silica modified alumina (e.g., silica modified gamma alumina), wherein the silica can be present in an amount of less than or equal to about 10 wt %, or, more specifically, about 3 wt % to about 8 wt %, or, even more specifically, about 4 wt % to about 6 wt %, based upon a total weight of the alumina.

Boron modification of the alumina can be accomplished in various fashions, including modifying the alumina before introduction of the active material, modifying a finished catalyst formulation (comprising alumina and the active material), as well as combinations of at least one of the foregoing modifications. For example, the alumina can be contacted with (e.g., immersed in) a solution of boric acid, dried and calcined (e.g., at about 550° C. to about 1,000° C.) to form a modified alumina containing additional borate surface species. The active material can then be disposed on the modified alumina.

In another example, the formed catalyst (e.g., PGM, alumina, and optionally zeolites) can receive the boron material (e.g., alumina can be post-impregnated with the boron material). In this embodiment, the active material can be disposed on alumina, and the alumina with the active material can be calcined to form a finished catalyst formulation. The finished catalyst formulation can contact (e.g., by spraying, dipping, immersing, painting, wash coating, imbibing, impregnating, physisorbing, chemisorbing, precipitating, otherwise applying, and the like) a boron material (e.g., boric acid). The catalyst can then again be dried and calcined for form the modified alumina catalyst.

The type of active material (also know as the catalytic material) employed with the modified alumina is dependent upon the type of device in which the catalyst will be employed. For a compression ignition (e.g., diesel) oxidation catalyst, for example, the catalytic material can additionally contain platinum, palladium, iridium, rhodium, ruthenium, and the like, as well as oxides, alloys, and combinations comprising at least one of the foregoing catalytic materials, and optionally, tantalum, zirconium, yttrium, cerium, nickel, manganese, and/or copper. The modified alumina is particularly useful in inhibiting the sintering of platinum disposed at the alumina.

Catalyst loadings are expressed in terms of concentration of active (catalytic) metal in the support, and concentration of active (catalytic) metal on a substrate, if employed. For example, in some embodiments, concentrations of catalytic metal in the support can be about 0.1 to about 10 wt %, or, more specifically, about 1 wt % to about 3 wt %, based upon the total dry weight of the calcined support (modified alumina support) and active metal. Loadings on a substrate can, in some applications, be about 10 grams per cubic foot of substrate ($g/ft^3$) to about 300 $g/ft^3$, or, more specifically, about 25 $g/ft^3$ to about 200 $g/ft^3$, or, even more specifically, about 50 $g/ft^3$ to about 150 $g/ft^3$. The catalytic material can be supported on the alumina and disposed on and/or throughout (collectively referred to herein as "on") a substrate, e.g., wash coated, imbibed, impregnated, physisorbed, chemisorbed, precipitated, or otherwise applied to the substrate.

The catalytic material(s) can be combined with additional material(s) and disposed at the alumina (e.g., on and/or in the alumina), or the catalytic material and additional material(s) can be sequentially disposed on the alumina. The additional materials can include alkali metals, alkaline earth metals, Group II metals, rare earth metals, Group VIII metals, and the like, as well as, oxides, alloys, and combinations comprising at least one of the foregoing. Materials added to improve usability of the support (i.e., during washcoating onto a substrate), to improve adhesion onto a support, and/or to act as a co-catalyst and/or activity enhancer for the active metal. Some possible materials can include barium, (e.g., added as BaO, $BaCO_3$, $BaSO_4$, organometallic compounds of Ba, and/or the like), alumina oxides, aluminum nitrate, and the like, and combinations comprising at least one of the foregoing.

The catalyst material(s) can be disposed on the alumina (and/or the modified alumina) by combining the alumina (and/or the modified alumina) with the catalyst material(s) to form a mixture, drying (actively or passively), and optionally calcining. More specifically, a slurry can be formed by combining alumina powder and water, and optionally pH control agents (such as inorganic or organic acids and bases) and/or other components. The catalytic material(s) (e.g., catalytic metals, such as Pt), can be added as salt(s) (e.g., inorganic salt(s) and/or organic salt(s)). This slurry can then be washcoated onto a suitable substrate. The washcoated product can be dried and heat treated to fix the washcoat onto the substrate.

The catalyst formulation can further comprise a zeolite. Possible zeolites include Y-type zeolite, beta zeolite, ZSM-5, and the like, as well as combinations comprising at least one of the foregoing zeolites. The zeolite can, for example, have a silica to alumina ratio (Si:Al) of about 25 to about 80, or, more specifically, about 35 to about 60. If the zeolite is employed, it can be added to the slurry along with the catalytic material (e.g., before the catalytic material has been calcined).

This slurry can be dried and heat treated, e.g., at temperatures of about 500° C. to about 1,000° C., or, more specifically, about 500° C. to about 700° C., to form the finished catalyst formulation. The finished catalyst formulation can be disposed in a solution of boric acid and again dried and heat treated to form the modified catalyst formulation. The modified catalyst formulation can then be reformed into a slurry and washcoated onto a substrate. Alternatively, or in addition, the slurry can be washcoated onto the substrate and then heat treated as described above, to adjust the surface area and crystalline nature of the support. Once the support has been heat treated, catalyst metals can be disposed on the support. The catalyst metals, therefore, can be added after the washcoat is fixed onto the substrate by additional washcoat steps and/or by exposing the washcoated substrate to a liquid containing the catalytic metal.

The supported catalyst can comprise a platinum group metal (PGM), boron modified alumina, and zeolite, and optionally silica. The amounts of these components in the supported catalyst can be: about 0.1 wt % to about 10 wt % PGM, about 50 wt % to about 80 wt % boron modified alumina (e.g., comprising about 0.1 wt % to about 7 wt % boron), and about 10 wt % to about 50 wt % zeolite; or, more specifically, about 1 wt % to about 5 wt % PGM, about 50 wt % to about 75 wt % boron modified alumina (e.g., comprising about 0.1 wt % to about 7 wt % boron, based upon the total weight of the alumina and silica), and about 25 wt % to about 45 wt % zeolite; or, even more specifically, about 1 wt % to about 3 wt % PGM, about 62 wt % to about 74 wt % boron modified alumina (e.g., comprising about 0.1 wt % to about 7 wt % boron), and about 25 wt % to about 35 wt % zeolite. The boron modified alumina can comprise about 1 wt % to about 10 wt % silica, or, more specifically, about 3 wt % to about 8 wt % silica, or, even more specifically, about 4 wt % to about 6 wt %, based upon a total weight of the alumina (i.e., excluding the boron weight).

The supported catalyst can be disposed at a substrate. The substrate can comprise any material designed for use in the desired environment, e.g., a compression ignition engine (e.g., a diesel engine) environment. Some possible materials include cordierite, silicon carbide, metal, metal oxides (e.g., alumina, and the like), glasses, and the like, and mixtures comprising at least one of the foregoing materials. These materials can be in the form of packing material, extrudates, foils, perform, mat, fibrous material, monoliths (e.g., a honeycomb structure, and the like), other porous structures (e.g., porous glasses, sponges), foams, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate can have any size or geometry, the size and geometry are preferably chosen to optimize geometric area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Once the supported catalytic material is on the substrate, the substrate can be disposed in a housing to form the reformer. The housing can have any design and comprise any material suitable for the application. Suitable materials for the housing can comprise metals, alloys, and the like, such as ferritic stainless steels (including stainless steels such as, e.g., the 400—Series such as SS-409, SS-439, and SS-441), and other alloys (such as those containing nickel (Ni), chromium (Cr), aluminum (Al), yttrium (Y), and the like, e.g., to permit increased stability and/or corrosion resistance at operating temperatures or under oxidizing or reducing atmospheres).

Also similar materials as the housing, end cone(s), end plate(s), exhaust manifold cover(s), and the like, can be concentrically fitted about the one or both ends and secured to the housing to provide a gas tight seal. These components can be formed separately (e.g., molded or the like), or can be formed integrally with the housing using a methods such as, e.g., a spin forming, or the like.

Disposed between the housing and the substrate can be a retention material. The retention material, which may be in the form of a mat, particulates, or the like, may be an intumescent material (e.g., a material that comprises vermiculite component, i.e., a component that expands upon the application of heat), a non-intumescent material, or a combination thereof. These materials may comprise ceramic materials (e.g., ceramic fibers) and other materials such as organic and inorganic binders and the like, or combinations comprising at least one of the foregoing materials.

During use, the housing can be disposed in an exhaust system (e.g., of a compression ignition engine). Exhaust from the engine flows into the housing and contacts the oxidation catalyst. The catalyst oxidizes exhaust stream components.

The following examples are intended to be illustrative, not limiting.

The composition of the various samples is as follows:

Reference: delta alumina commercially available from Condea under the tradename Puralox SCFA-90), with a beta zeolite having a silica:alumina ($SiO_2$:$Al_2O_3$) ratio of 40. The platinum (Pt) was from platinum nitrate (commercially available from Haraeus, Calif.) comprising 20 wt % to 36 wt % Pt concentration with $H^+$/Pt molar ratio of 2.5 to 4.5, and a sodium/platinum (Na/Pt) weight ratio of less than or equal to 3,200 parts per million (ppm)).

Sample 1: the composition of Reference 1 where the alumina was modified with 1 wt % boron based upon the total weight of the alumina, wherein the boron was pre-impregnated into the alumina (impregnation of boric acid, dry, and calcine at 540° C. for 4 hours, prior to disposing platinum on the alumina).

Sample 2: the composition of Reference 1 where the alumina was modified with 1 wt % boron based upon the total weight of the alumina, wherein the boron was post-impregnated into the catalyzed alumina (impregnation into an alumina that comprises the platinum and that has been dried and calcined, of boric acid, and again drying, and calcining (boron calcination at 540° C. for 4 hours).

Sample 3: the composition of Sample 2, except that (i) the alumina was a silica ($SiO_2$) modified gamma alumina (Siralox 5/170 commercially available from Sasol, Houston, Tex.) comprising about 5.5 wt % $SiO_2$ based upon the total weight of the silica and alumina) and the platinum metal was formed from platinum monoethanolamine.

Sample 4: the composition of Sample 3, except that the alumina was a pure gamma alumina commercially available from Sasol under the tradename Puralox HP14.

Sample 5: the same composition as Sample 1, except the boron concentration is 5 wt %.

Sample 6: the composition of Sample 3 without boron modification.

All of the samples and the reference had the same nominal platinum loading (about 70 grams per cubic foot) and were formed in the same fashion, beside the timing of the boron modification. (For clarity, actual Pt loadings are provided on some of the samples) A slurries of the materials were formed and applied to a cordierite substrate monoliths for the testing on the dynometer.

TABLE 1

| | CO Light-Off (° C.) | | |
| --- | --- | --- | --- |
| | Reference | Sample 1 | Sample 2 |
| Fresh | 159.5 | 151.1 | 154.0 |
| 20 hours SOx aging | 169.3 | 160.6 | 168.1 |
| ΔT* (SOx aged - Fresh) | 9.8 | 9.5 | 14.1 |
| ΔT (Fresh versus Fresh Reference) | | −8.4 | −5.6 |
| ΔT (SOx aged versus SOx aged Reference) | | −8.7 | −1.2 |

ΔT = change in temperature

TABLE 2

| | CO Light-Off (° C.) | | | |
| --- | --- | --- | --- | --- |
| | Reference | Sample 2 | Sample 3 | Sample 4 |
| Pt Loading | 69.8 | 68.5 | 68.8 | 68.1 |
| Fresh | 152.0 | 150.9 | 151.2 | 167.4 |
| 20 hours SOx aging | 180.9 | 181.5 | 168.2 | 197.3 |
| ΔT* (SOx aged - Fresh) | 28.9 | 30.6 | 17.0 | 29.9 |
| ΔT (Fresh versus fresh Reference) | | −1.0 | −0.8 | 15.4 |
| ΔT (SOx aged versus SOx aged Reference) | | 0.7 | −12.6 | 16.5 |

TABLE 3

| | CO Light-Off (° C.) | | |
| --- | --- | --- | --- |
| | Reference | Sample 5 | Sample 6 |
| Fresh | 125.1 | 120.4 | 125.0 |
| 20 hours SOx aging | 140.8 | 137.3 | 139.7 |
| 20 hours SOx aging and thermal aging at 650° C. for 8 hours | 154.4 | 144.6 | 149.2 |
| ΔT (thermal/SOx aging - SOx aging) | | 15.8 | 17.0 | 14.8 |
| ΔT (thermal/SOx aged - Fresh) | 29.4 | 24.3 | 24.3 |
| ΔT (Fresh vs Fresh Reference) | | −4.7 | −0.1 |
| ΔT (SOx aged vs SOx aged Reference) | | −4.7 | −1.1 |
| ΔT (thermal/SOx aged versus thermal/SOx aged Reference) | | −9.8 | −5.2 |

TABLE 4

| | CO Light-Off (° C.) | | | |
| --- | --- | --- | --- | --- |
| | Reference | Sample 1 | Sample 2 | Sample 3 |
| Pt Loading | 71.5 | 71.3 | 70.7 | 71.4 |
| Fresh | 154.0 | 152.8 | 152.0 | 152.3 |
| Aged at 650° C. for 50 hours | 206.0 | 200.8 | 201.2 | 199.0 |
| ΔT (aged - Fresh) | 52.0 | 48.0 | 49.2 | 46.8 |
| ΔT (Fresh versus Fresh Reference) | | −1.3 | −2.0 | −1.8 |
| ΔT (thermal aged versus thermal aged Reference) | | −5.3 | −4.8 | −7.0 |

As can be seen from Tables 1-4, various CO light-off temperatures were tested under various conditions, e.g., fresh, after 20 hours (h) of sulfur oxides aging, after 20 hours of sulfur oxides (SOx) aging and thermal aging at 650° C. for 8 hours, and after thermal aging at 650° C. for 50 hours. In Table 1, it was observed that an alumina (particularly delta and theta phase alumina) with boron, Sample 2, has lower light-off temperatures, both fresh and after 20 hours of SOx aging. Considering that a decrease in the light-off temperature of 2-3° C. is considered significant (due to the low operating temperatures and the low light off temperatures (e.g., below about 200° C.)), the improvement of more than 8° C. is substantial and highly desirable. Basically, a difference of 2° C. effects the cold start conditions (e.g., the emissions during cold start). A change of as little as 2° C. (e.g., from 152° C. to 154° C.) can take about 20 seconds or more. During this time, a significant amount of catalyst poisoning can occur and an unacceptable amount of contaminants can exit the exhaust system. From this example, it can be seen that light off temperatures of less than or equal to about 160° C. can be obtained even after SOx aging of 20 hours. This suggests the desirability of premodification delta-theta alumina with boron. The very low change in light off temperature after hydrothermal aging was also unexpected. All of the samples had a lower light off temperature after thermal aging than did the reference.

Table 2 illustrates a substantial, unexpected reduction of the light off temperature with a post modified alumina (namely gamma alumina) where the alumina comprises silica; Sample 3. In this example, CO light-off temperatures of less than or equal to about 168° C. were obtained with Sample 4, while the Reference exhibited a SOx aged light-off of greater than 180° C. Meanwhile, Table 3 provides support that silica modified gamma alumina that is post impregnated with the boron provides a lower light off temperature than the reference.

Table 4 illustrates the synergy between the boron and the silica modified alumina. In this table, Sample 6 (comprising the silica modified alumina) performed substantially similarly as the Reference, while in Table 3, the same composition as Sample 6, but with boron post impregnation, (Sample 3) performed substantially better than the reference.

The boron modified alumina (particularly boron modified alumina that has been silica modified) enables the production of a catalyst that resists sulfur poisoning (e.g., possibly by inhibiting adsorption of sulfur compounds (e.g., $H_2S$, $CS_2$, and the like), and inhibits sintering of the active material at high temperature (e.g., about 600° C. to about 800° C.) (e.g., decreases the rate of hydrothermal aging), while substantially retaining the properties of the alumina.

Combustion ignition engines typically operate at temperatures of as high as about 900° C.-1,050° C. and under stoichiometric conditions (i.e., an air to fuel ratio (A/F) of about 14.7). A compression ignition engine typically operates at temperatures less than 500° C. and in a large excess of oxygen (and nitrogen) (e.g., an A/F of greater than or equal to about 20:1) that can be as high as an A/F of 100 (i.e., 100:1). Due to the conditions of the compression ignition engine (e.g., a diesel engine), low light off temperatures are desirable.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An oxidation catalyst, comprising: a catalytic material disposed on a support, wherein the catalytic material is selected from the group consisting of platinum, palladium, iridium, rhodium, ruthenium, alloys thereof, and combinations thereof; wherein the support comprises boron modified alumina and about 10 wt % to about 50 wt % zeolite, based upon the total weight of the support, and wherein the boron is present in a sufficient amount up to less than or equal to about 7 wt %, based upon a total weight of the alumina, to selectively poison a portion of the alumina.

2. The oxidation catalyst of claim 1, wherein the alumina further comprises about 1 wt % to about 10 wt % silica, based upon the total weight of the alumina and silica.

3. The oxidation catalyst of claim 2, wherein the alumina comprises about 3 wt % to about 8 wt % silica.

4. The oxidation catalyst of claim 3, wherein the alumina further comprises about 4 wt % to about 6 wt % silica.

5. The oxidation catalyst of claim 1, wherein the catalytic metal is present in an amount of about 0.1 wt % to about 10 wt %, the boron modified alumina is present in an amount of about 50 wt % to about 80 wt %, and the zeolite is present in an amount of about 10 wt % to about 50 wt %, based upon the total weight of the oxidation catalyst; and wherein the boron is present in an amount of about 0.1 wt % to about 5 wt % boron.

6. The oxidation catalyst of claim 5, wherein the catalytic metal is present in an amount of about 1 wt % to about 5 wt %, the boron modified alumina is present in an amount of about 50 wt % to about 75 wt %, and the zeolite is present in an amount of about 25 wt % to about 45 wt %, based upon the total weight of the oxidation catalyst; and wherein the boron is present in an amount of about 0.1 wt % to about 5 wt % boron; and wherein the alumina further comprises about 1 wt % to about 10 wt % silica, based upon the total weight of the alumina and silica.

7. The oxidation catalyst of claim 6, wherein the catalytic metal is present in an amount of about 1 wt % to about 3 wt %, the boron modified alumina is present in an amount of about 62 wt % to about 74 wt %, and the zeolite is present in an amount of about 25 wt % to about 35 wt %, based upon the total weight of the oxidation catalyst; and wherein the boron is present in an amount of about 0.5 wt % to about 2.5 wt % boron; and wherein the alumina further comprises about 3 wt % to about 8 wt % silica, based upon the total weight of the alumina and silica.

8. The oxidation catalyst of claim 6, wherein the amount of boron is about 1 wt % to about 2 wt %.

9. The oxidation catalyst of claim 1, wherein the catalytic material comprises platinum.

10. The oxidation catalyst of claim 1, wherein the oxidation catalyst is capable of oxidizing an exhaust stream component under compression ignition exhaust conditions.

11. A catalytic device, comprising: a housing disposed around a substrate; a compression ignition oxidation catalyst disposed at the substrate, the compression ignition oxidation catalyst comprising a catalytic material disposed on a support, wherein the catalytic material is selected from the group consisting of platinum, palladium, iridium, rhodium, ruthenium, alloys thereof, and combinations thereof; and wherein the support comprises boron modified alumina and about 10 wt % to about 50 wt % zeolite, based upon the total weight of the support, and wherein the boron is present in a sufficient amount up to less than or equal to about 7 wt %, based upon a total weight of the alumina, to selectively poison a portion of the alumina.

12. The catalytic device of the claim 11, further comprising a retention material disposed between the housing and the substrate.

13. A method for treating a compression ignition exhaust stream, comprising: introducing the compression ignition exhaust stream to a compression ignition oxidation catalyst; and oxidizing an exhaust stream component; wherein the compression ignition oxidation catalyst comprises a catalytic material disposed on a support, wherein the catalytic material is selected from the group consisting of platinum, palladium, iridium, rhodium, ruthenium, alloys thereof, and combinations thereof; and wherein the support comprises boron modified alumina and about 10 wt % to about 50 wt % zeolite, based upon the total weight of the support, and wherein the boron is present in a sufficient amount up to less than or equal to about 7 wt %, based upon a total weight of the alumina, to selectively poison a portion of the alumina.

* * * * *